US009300871B2

(12) United States Patent
Zhou et al.

(10) Patent No.: US 9,300,871 B2
(45) Date of Patent: Mar. 29, 2016

(54) STATIONARY CAMERA DETECTION AND VIRTUAL TRIPOD TRANSITION FOR VIDEO STABILIZATION

(75) Inventors: Jianping Zhou, Fremont, CA (US); Sebastien X. Beysserie, Milpitas, CA (US); George E. Williams, Pleasanton, CA (US); Rolf Toft, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/492,769

(22) Filed: Jun. 8, 2012

(65) Prior Publication Data
US 2013/0329062 A1    Dec. 12, 2013

(51) Int. Cl.
*H04N 5/228*    (2006.01)
*H04N 5/232*    (2006.01)

(52) U.S. Cl.
CPC ................................ *H04N 5/23248* (2013.01)

(58) Field of Classification Search
CPC .......... H04N 5/23248; H04N 5/23251; H04N 5/23254; H04N 5/23258; H04N 5/23261; H04N 5/23264
USPC ........................................... 348/208.6, 208.1
See application file for complete search history.

(56) References Cited

U.S. PATENT DOCUMENTS

| | | | |
|---|---|---|---|
| 6,748,114 B1* | 6/2004 | Ishikawa | H04N 19/114 348/700 |
| 8,150,181 B2 | 4/2012 | Bruna et al. | |
| 2006/0132612 A1 | 6/2006 | Kawahara | |
| 2008/0165280 A1 | 7/2008 | Deever et al. | |
| 2008/0309769 A1 | 12/2008 | Albu et al. | |
| 2010/0158493 A1* | 6/2010 | Miyasako | 396/55 |
| 2012/0120264 A1* | 5/2012 | Lee et al. | 348/208.4 |
| 2013/0076921 A1* | 3/2013 | Owen | H04N 5/23258 348/208.4 |
| 2013/0135430 A1* | 5/2013 | Liu et al. | 348/42 |

FOREIGN PATENT DOCUMENTS

| | | |
|---|---|---|
| EP | 0587432 A1 | 3/1994 |
| EP | 2200276 A1 | 6/2010 |

OTHER PUBLICATIONS

Tsoligkas et al., "A Motion Model Based Video Stabilisation Algorithm," School of Science and Technology, University of Teesside, Middlesbrough, TS1 3BA, UK (retrieved on Aug. 22, 2012 from URL: http://www.wacong.org/wac2006/allpapers/ifmip/ifmip_85.pdf).
International Search Report and Written Opinion, dated Jul. 29, 2013, from corresponding International Patent Application No. PCT/US2013/042427 filed May 23, 2013, 11 pages.

* cited by examiner

*Primary Examiner* — Antoinette Spinks
(74) *Attorney, Agent, or Firm* — Kenyon & Kenyon LLP

(57) ABSTRACT

An apparatus, method, and computer-readable medium for motion sensor-based video stabilization. A motion sensor may capture motion data of a video sequence. A controller may compute instantaneous motion of the camera for a current frame of the video sequence and accumulated motion of the camera corresponding to motion of a plurality of frames of the video sequence. The controller may compare the instantaneous motion to a first threshold value, compare the accumulated motion to a second threshold value, and set a video stabilization strength parameter for the current frame based on the results of the comparison. A video stabilization unit may perform video stabilization on the current frame according to the frame's strength parameter.

30 Claims, 6 Drawing Sheets

500

600

STATIONARY CAMERA DETECTION AND VIRTUAL TRIPOD TRANSITION FOR VIDEO STABILIZATION

BACKGROUND

The subject matter of this application is directed to video stabilization and, particularly, to detections of whether camera motion is intentional or unintentional and setting video stabilization parameters based on such detections.

Today, many portable electronic devices are equipped with digital cameras that are capable of capturing video. Captured video from these portable electronic devices may contain shake due to unintentional motion of the camera. Unintentional motion of the camera often occurs due to motion introduced by a shaking hand. To correct for the shake, the sequence of frames in the video may be adjusted by a video stabilization procedure. Video stabilization procedures can compensate for the undesired motion of the camera by different image processing techniques.

For example, video stabilization can be achieved by capturing a larger image than an image being displayed or recorded, thereby creating a spatial buffer of pixels around the edge of the recorded or displayed image. A crop region may be defined and positioned on a per frame basis to compensate for the detected motion. The pixels in the buffer can be used to provide the extra pixels needed to shift the crop region. Additional geometric transforms may be applied to the image inside the crop region to compensate for the effects of perspective.

The motion of portable electronic device can be detected by analyzing the content of frames or obtained from motion data provided by a motion sensor, such as a gyroscope, disposed within the portable electronic device. However, not all of the detected motion of the portable electronic device is unintentional. Intentional camera motion may be detected due to panning the camera or walking with the camera. If the above-discussed stabilization methods are applied to correct for intentional camera motion, undesired image processing may be performed on the captured image sequence. In addition, because intentional camera motion due to panning or walking may exceed the degree of image motion that the stabilization methods can correct, undesired periodic shifting of the image frame may be generated when the degree of motion exceeds the capabilities of the stabilization procedures.

Accordingly, the inventors have identified a need in the art for video stabilization that takes into account whether the motion of a portable device is intentional or unintentional. In particular, the inventors have identified a need in the art for video stabilization that adjusts the degree of video stabilization based on whether the motion of a portable device is intentional or unintentional and the classification of the intentional movement into various classes such as panning or holding steady.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of the present invention provide techniques for stabilizing frames of a video sequence based on data received from a motion sensor. The data from the motion sensor can be used to determine whether the motion of the camera is intentional or non-intentional and the parameters for the video stabilization can be set based on this determination. For example, a controller may compute instantaneous motion of the camera for a current frame of the video sequence and accumulated motion of the camera corresponding to motion of a plurality of frames of the video sequence. The controller may compare the instantaneous motion to a first threshold value, compare the accumulated motion to a second threshold value, and set a video stabilization strength parameter for the current frame based on the results of the comparison. A video stabilization unit may perform video stabilization on the current frame according to the frame's strength parameter.

Figure 1:
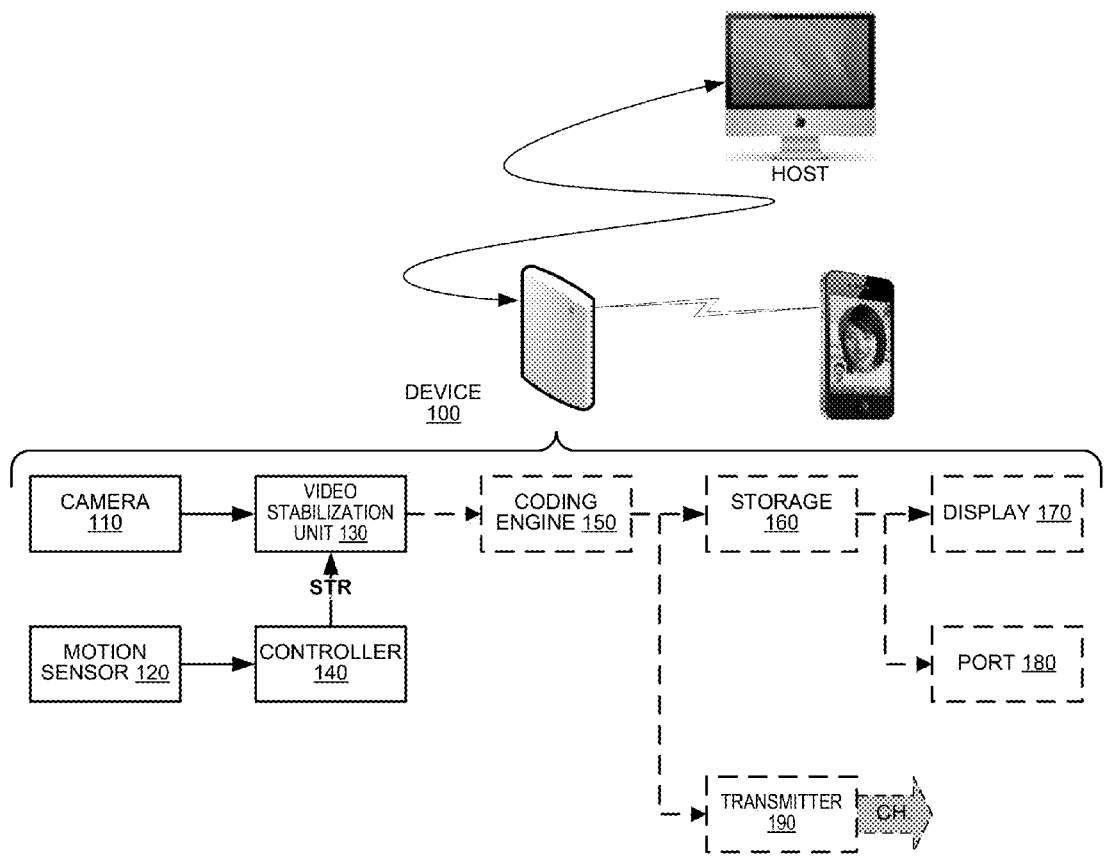
FIG. 1 is a simplified block diagram of a camera-enabled device according to an embodiment of the present invention.

FIG. 1 is a simplified block diagram of a camera-enabled device 100 according to an embodiment of the present invention. The device 100 may include a camera 110, motion sensor 120, video stabilization unit 130 and a controller 140. The camera 110 may capture visual information and generate video data therefrom. The motion sensor 120 may detect motion of the device 100 (and, by extension the camera 110) and output motion data to the controller 140. The video stabilization unit 130 may perform stabilization techniques on the input video sequence in an attempt to improve the perceptual quality of the video sequence.

For example, the stabilization techniques can attempt to cancel visual artifacts in the video sequence that arise due to unintentional camera motion (e.g., motion introduced by shaky hands). The video stabilization unit 130 may operate according to a variety of operational parameters (not shown) provided by the controller 140. For example, the controller 140 may develop a strength parameter based on its interpretation of motion data supplied by the motion sensor 120. The controller 140 may develop the strength parameter based on whether the motion of the camera is determined to be intentional or unintentional, and on a classification of intentional motion. For example, a lower strength parameter may be provided when intentional motion such as panning is detected so that the video stabilization unit 130 does not compensate for this intentional motion. In contrast, a higher strength parameter may be provided when the intention of holding steady is detected so that the video stabilization unit 130 corrects more strongly for the unintentional motion. The strength parameter may be provided for each frame of the video. Optionally, the controller 140 may determine an operational strength for the video stabilizer 130 based on the motion derived from the image data in the input video sequence. The controller 140 may be part of the video stabilization unit 130. The controller 140 may estimate motion of the camera 110 in three dimensions (e.g., pitch/roll/yaw, quaternion units, or x, y, z coordinates).

The motion sensor 120 may output data to the controller 140 representing motion of the camera during each frame. Typically, the motion sensor 120 will output multiple samples of data during each frame. In an embodiment, the motion sensor sampling rate may be 200 Hz. Thus, if the camera outputs video data at 30 frames per second, the motion sensor may generate between 6 and 7 samples of motion data for each frame of video. In a further embodiment, the motion sampling rate may be between 50 Hz and 200 Hz. In an embodiment, the motion sensor 120 may be an accelerometer, a digital compass, a microelectrical mechanical systems ("MEMS") motion sensor device or a gyroscope. The motion sensor 120 may be mounted within a common housing of the camera 110 or on a common board (not shown) as the camera 110 within the device 100 so that motion of the motion sensor 120 also reflects motion of the camera 110.

The camera 110 may output frames of video to the video stabilization unit 130 to perform stabilization techniques on the input video sequence. During operation, the camera 110 may output frames of video of a predetermined size. The video stabilization unit 130 may selectively crop image data from the frames in order to compensate for motion detected within the image content. Video captured by the camera 110 and motion data from the motion sensor 120 may be correlated. The camera 110 and the motion sensor 120 may operate asynchronously. A common clock may be used to timestamp both video data and motion data to facilitate the synchronization of asynchronously captured image and motion data by putting them on a common timeline.

In FIG. 1, the device 100 is illustrated as a smartphone, but the principles of the present invention are not so limited. Embodiments of the present invention may be applied in a variety of types of devices, including, for example, portable computers, tablet computers, webcams, digital cameras, and/or camcorders. Accordingly, the camera 110 may include a front facing camera, a rear facing camera or both.

Conventionally, there are storage buffers between each of the components shown in FIG. 1. For example, the video stabilization unit 130 may read video data from a buffer and then write stabilized video data to another buffer. Storage buffers may also be present between components of the coding engine (not shown). These buffers aren't illustrated in FIG. 1 for ease of discussion.

Further, the principles of the present invention may be applied in a variety of uses cases. In one use case, video captured by the device 100 may be stored on the device for later playback. Accordingly, FIG. 1 illustrates that the device 100 may include a video coder 150 to compress a video sequence output by the video stabilizer 130 and storage 160 to store the compressed video. In an embodiment, the non-compressed video sequence output by the video stabilizer 130 may be directly stored in storage 160. FIG. 1 also illustrates a display 170 on which the video sequence may be rendered following user selection and decompression if necessary (operations not shown).

In another use case, illustrated in FIG. 1, the video sequence may be uploaded to a host computer. In this case, the device 100 also may employ a video coder 150 and storage 160 to store compressed video until it is uploaded to the host computer via a communication port 180.

In a further use case, also illustrated in FIG. 1, the video sequence may be exchanged with another device as part of real time communication among the devices (ex., a videoconference). In this case, the device 100 may employ a video coder 150 to compress the video sequence and a transmitter 190 to transmit the compressed video to the other device by a wired or wireless communication connection. Although the compressed video typically is buffered prior to transmission, FIG. 1 illustrates the transmitter 190 receiving compressed video directly from the video coder 150 to represent that the video sequence need not be stored persistently by the device 100.

The video stabilizer 130 may perform video stabilization on the video sequence based on operational parameters derived from the controller 140. Embodiments of the present invention may adjust operational parameters of the video stabilizer 130 (colloquially, its "strength") based on a strength parameter determined by the controller 140. The value of the strength parameter may be based on the analysis of the motion data supplied by the motion sensor 120. The value of the strength parameter may correspond to the degree of video stabilization to be performed by the video stabilizer 130.

In an embodiment, the controller 140 may determine the strength parameter based on whether the motion of the camera is intentional or unintentional. When the motion of the camera is determined to be intentional (e.g., motion due to panning or walking), the controller 140 may provide a strength parameter that minimizes the video stabilization. However, when the motion of the camera is determined to be unintentional (e.g., motion due to shaking hands), the controller 140 may provide a strength parameter that maximizes the video stabilization. The controller 140 may provide a strength parameter that varies proportionally with the degree of intentional and/or unintentional motion.

Figure 2:
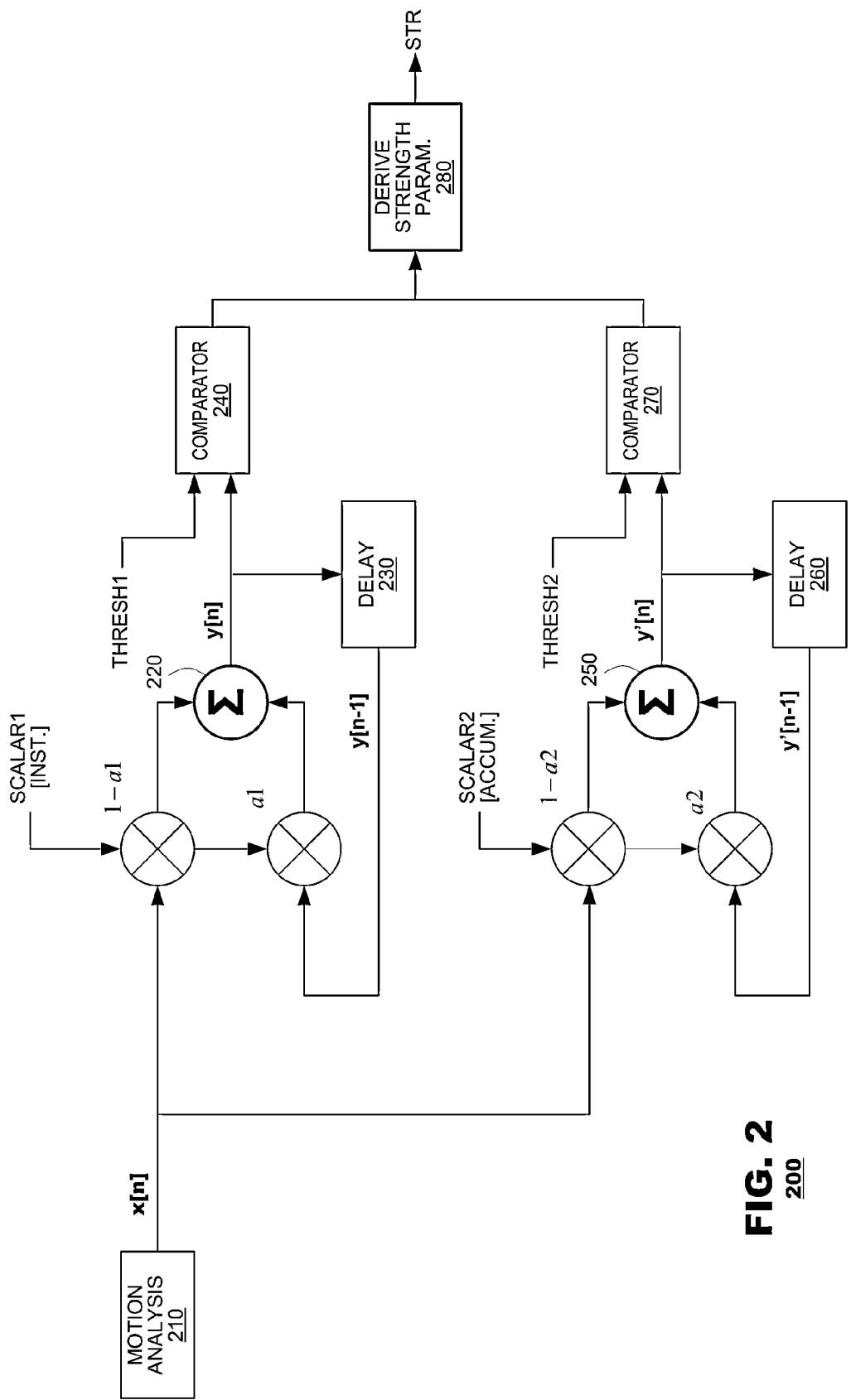
FIG. 2 is a data flow diagram illustrating derivation of a strength parameter based on motion analysis of a frame according to an embodiment of the present invention.

FIG. 2 is a data flow diagram 200 illustrating derivation of a strength parameter based on motion analysis of a frame according to an embodiment of the present invention. The derivation of the strength parameter may be performed by the controller 140. The strength parameter may be derived by comparing the instantaneous and accumulated camera motion to a pair or threshold values. The instantaneous and accumulated camera motion may be calculated by feeding the motion data through one or more lowpass filters to eliminate high frequency components. A first lowpass filter may be used to estimate the instantaneous camera motion and a second lowpass filter may be used to estimate the accumulated camera motion. The lowpass filters may be infinite impulse response (IIR) lowpass filters. In one embodiment the filters may be represented by equation:

$$y[n]=a*y[n-1]+(1-a)*x[n], \quad (1)$$

where y[n] represents the camera motion for the current frame, y[n−1] represents the camera motion for the previous frame, x[n] represents the motion analysis for the current frame and a is the scaling variable, between 0 and 1, for controlling the contribution of components y[n−1] and x[n] to the camera motion estimation. Scaling variable a can be set to a low value (e.g., 0.05) to determine the instantaneous camera motion and can be set to a high value (e.g., 0.8) to determine the accumulated camera motion.

As shown in FIG. 2, motion analysis may be performed on motion data received for the current frame (box 210). The results of the motion analysis x[n] for the current frame may be used to obtain instantaneous camera motion y[n] and accumulated camera motion y'[n]. The instantaneous camera motion y[n] is obtained by summing (step 220) a first value representing the motion for the current frame and a second value representing the previous instantaneous motion. The contribution of the current frame can be obtained by multiplying the motion analysis x[n] for the current frame by (1-a1), where a1 represents a scaling variable. The contribution of the previous instantaneous motion can be obtained by multiplying the camera position for the previous frame y[n−1] by the scaling variable a1. To estimate the instantaneous camera motion the scaling variable SCALAR1 (i.e. a1) is set to a low value (e.g., 0.05). The camera position of the previous frame y[n−1] can be obtained by delaying (box 220) the camera position for the current frame y[n]. The initial value of y[n−1] can be set to zero or a predetermined value.

The instantaneous camera motion y[n] can be compared (box 240) to a threshold value THRESH1. If the instantaneous camera motion y[n] is above or equal to the threshold value THRESH1 then the camera can be determined as non stationary.

The accumulated camera motion y'[n] can be obtained by summing (step 250) a first value representing the motion for the current frame and a second value representing the previously accumulated motion. The contribution of the current frame can be obtained by multiplying the motion analysis for the current frame x[n] by (1-a2), where a2 represents a scaling variable. The contribution of previously accumulated motion can be obtained by multiplying the camera position for the previous frame y'[n−1] by the scaling variable a2. To estimate the accumulated camera motion the scaling variable SCALAR2 (i.e., a2) is set to a high value (e.g., 0.8). The camera position of the previous frame y'[n−1] can be obtained by delaying (box 260) the camera position for the current frame y'[n]. The initial value of y'[n−1] can be set to zero or a predetermined value.

The accumulated camera motion y' [n] can be compared (box 270) to a threshold value THRESH2. If the accumulated camera motion y[n] is above or equal to the threshold value THRESH2 then the camera can be determined as non stationary. If both instantaneous and accumulated camera motion are below the respective threshold values, the camera can be determined as stationary. A strength parameter can be set (box 250) based on the result of comparing the instantaneous camera motion and accumulated camera motion to a pair of threshold values (box 240 and box 270). The derived strength parameter may be used as input to the video stabilizer 130 (shown in FIG. 1). The purpose of video stabilization is to minimize the amount of unintentional shake, jerk, or high-frequency motion captured in video data (for example, due to shaking hands of the individual handling the camera). A high strength parameter may be derived as a result of unintentional shake, and a low strength parameter may be derived as a result of intentional movement.

Figure 3:
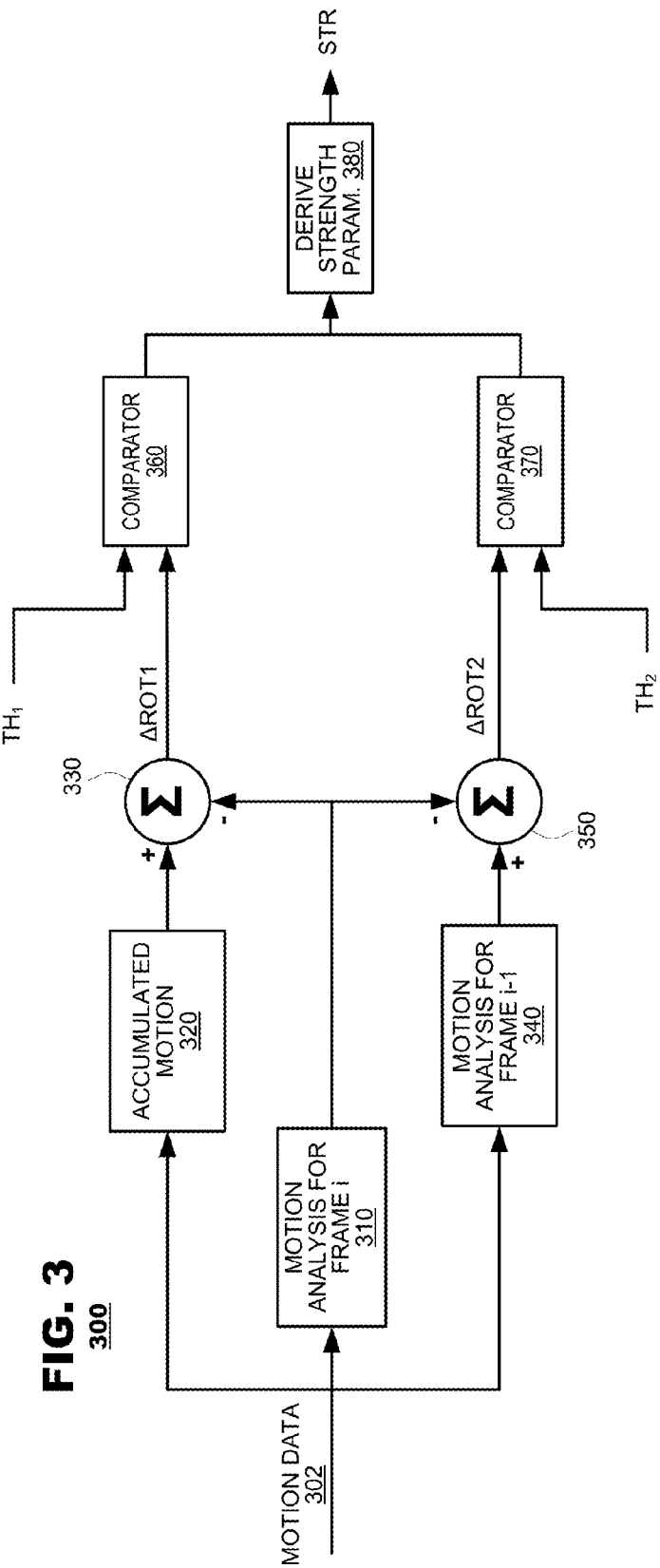
FIG. 3 is a data flow diagram illustrating derivation of a strength parameter according to an embodiment of the present invention.

FIG. 3 is a data flow diagram 300 illustrating derivation of a strength parameter according to an embodiment of the present invention. The strength parameter may be derived by using the instantaneous and accumulated camera positions. In particular, the strength parameter may be derived by comparing a pair of threshold values to the estimated intentional camera movement from a first frame to the current frame and to the estimated intentional camera movement from a previous frame to the current frame.

As shown in FIG. 3, motion analysis may be performed on motion data 302 received from a motion sensor (not shown). The motion analysis (box 310) may determine the movement (e.g., rotation) of the camera for frame i (i.e., current frame) from the motion data 302. The controller may determine an accumulated motion (box 320) over a predetermined number of frames or a predetermined time period. The accumulated motion may also be determined for movement from a first frame of a video sequence to the current frame. The accumulated motion may be the average camera motion over a number of frames or for a predetermined time. The controller may calculate (subtractor 330) a motion difference ΔROT1 between the camera motion at frame i and the accumulated camera motion. The value of the motion difference ΔROT1 may represent the intentional camera movement from a first frame to the current frame.

The motion analysis (box 340) may determine the motion (e.g., rotation) of the camera for frame i−1 (i.e., previous frame) based on the motion data 302. The motion of the current frame (box 310) may be stored or delayed and used as the motion for the previous frame (box 340) at the next frame. The controller may calculate (subtractor 350) a motion difference ΔROT2 between the camera motion at frame i−1 (or smoothed one) and the camera motion at frame i. The value of the motion difference ΔROT2 may represent the intentional camera movement from a previous frame to the current frame.

The motion differences ΔROT1 and ΔROT2 may be compared to a pair of threshold values TH1 and TH2, respectively, using comparators 360 and 370. The comparator 360 may compare motion difference ΔROT1 (e.g., intentional camera movement from the first frame to the current frame) to threshold value TH1. The comparator 370 may compare motion difference ΔROT2 (e.g., intentional camera movement from the previous frame to the current frame) to threshold value TH2. If the motion differences ΔROT1 and ΔROT2 are smaller than the respective threshold values TH1 and TH2, then the camera can be determined to be stationary (e.g., the camera motion is due to unintended camera movement). If at least one of the motion differences ΔROT1 and ΔROT2 is larger than the respective threshold value TH1 or TH2, then the camera can be determined to be non stationary (e.g., the camera motion is due to intended camera movement).

Thus, although motion difference ΔROT2 between the previous frame and the current frame may be minimal, if the motion difference ΔROT1 due to the accumulated camera motion between the first frame and the current frame exceeds the threshold value TH1, then the camera can be determined to be non stationary (i.e., intended camera movement). Such a scenario may include instances where the user holding the camera is slowly panning the camera by rotating the camera on an axis. Slow movement may result in a low motion difference ΔROT2 between the previous frame and the current frame but a large motion between the first frame and the current frame. The threshold values TH1 and TH2 may be set based on a type of camera setting (e.g., frame rate or stabilization settings), a type of camera or a type of application for which the camera is being used.

The controller may set a strength parameter based whether the camera is determined to be stationary or non stationary (box 380). In an embodiment, if the motion of the camera is determined to be stationary (i.e., unintended camera movement), the controller may set the strength parameter to a maximum setting and, if the motion of the camera is determined to be non stationary (i.e., intended camera movement), the controller may set the strength parameter to a minimum setting. Results from comparators 360 and 370 may be used (box 380) to set the strength parameter to intermediate settings based on the results of comparing the motion differences ΔROT1 and ΔROT2 to the threshold values TH1 and TH2. Results from comparators 360 and 370 may also adjust the strength parameter (box 380) based on the degree of detected motion. The controller may calculate strength settings anew for each input frame and may output the strength settings to the video stabilizer for use in processing the input frames. Alternatively, the strength settings may be calculated anew after a predetermined amount of time or after receiving a predetermined number of frames.

The derived strength parameter may be used as input to the video stabilizer 130 (shown in FIG. 1). The purpose of video stabilization is to minimize the amount of unintentional shake, jerk, or high-frequency motion captured in video data (for example, sue to shaking hands of the individual handling the camera). A high strength parameter may be derived as a result of unintentional shake, and a low strength parameter may be derived as a result of intentional movement.

The motion data for input frames 302 may include motion rate information: the rate at which the camera is being moved in, for example, each of 3 axes (x, y, and z). Rate information may be integrated to produce instantaneous position and rotation information (also in each of 3 axes). The rotation information may be quaternion data.

The motion analysis for the accumulated motion (box 320) and the previous frame i−1 (box 340) may be calculated by feeding the motion data of the previous frames through one or more lowpass filters to eliminate high frequency components. A first lowpass filter may be used to estimate the instantaneous camera position and a second lowpass filter may be used to estimate the accumulated camera position. The lowpass filters may be infinite impulse response (IIR) lowpass filters. In one embodiment the filters may be represented by equation (1), discussed above with reference to FIG. 1. In equation (1) scaling variable a can be set to a low value (e.g., 0.05) to determine the instantaneous camera position and can be set to a high value (e.g., 0.8) to determine the accumulated camera position.

In a further embodiment, the controller may derive the strength parameter by analyzing the minimum and maximum camera motion from a first frame to the current frame (i.e., accumulated camera motion). When the difference between the minimum and the maximum of the accumulated camera motion is smaller than a predetermined value then the intention can be determined to be to hold the camera stationary. However, if the difference between the minimum and the maximum of the accumulated camera motion is higher than a predetermined value then intention can be determined to be to hold the camera nonstationary. The strength parameter can be set to a high value or a low value depending on whether the camera is determined to be held stationary or nonstationary. The strength parameter can also be a function of the difference between the minimum and maximum values of the accumulated camera motion.

Figure 4:
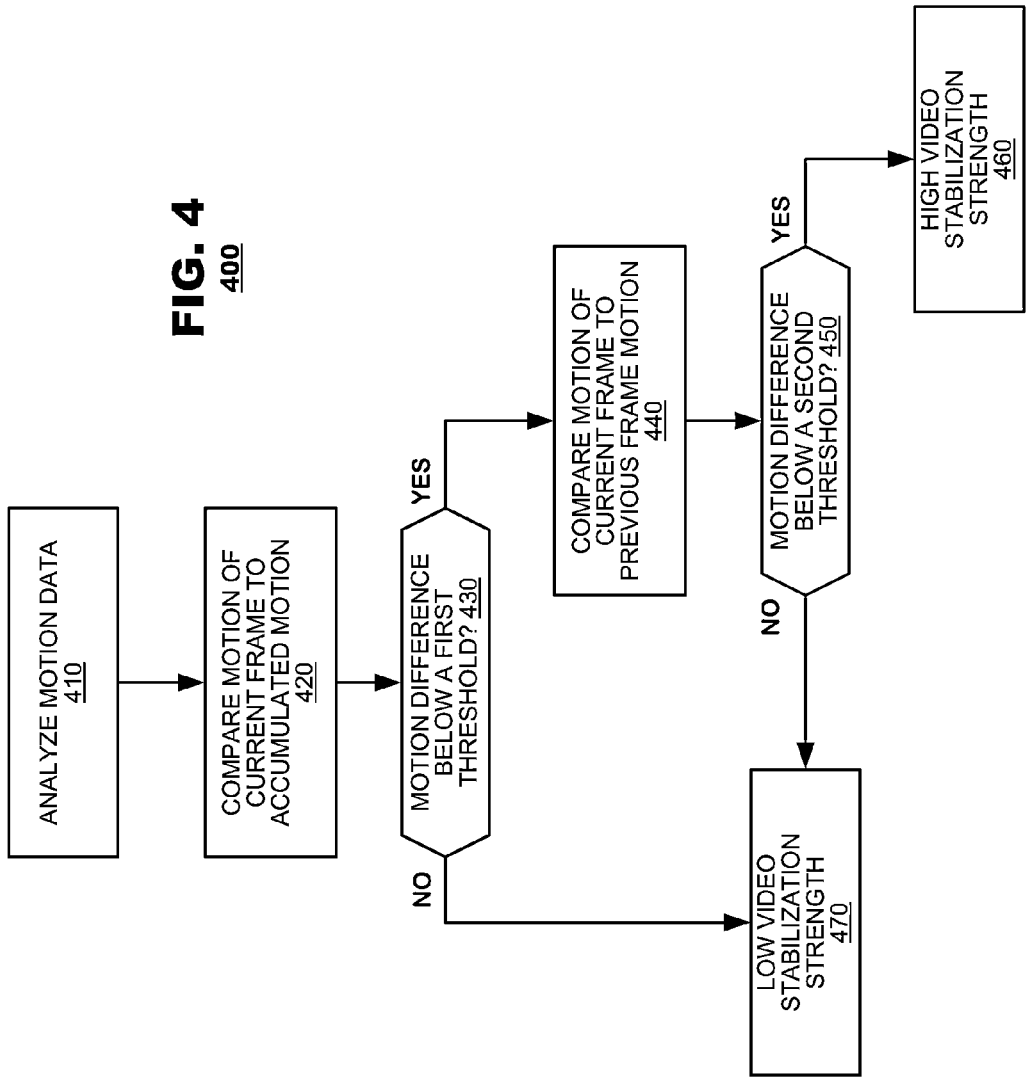
FIG. 4 illustrates a method for determining a video stabilization strength in an embodiment.

FIG. 4 illustrates a method 400 for determining a video stabilization strength in an embodiment. For a given frame of a video stream, the motion data from the motion sensor is analyzed (box 410). The method 400 may be performed for each sequential frame of a video stream. The analysis (box 410) may include determining the instantaneous motion of the current frame, the instantaneous motion of the previous frame and the accumulated motion of the previous frames (e.g., motion from the first frame to the current frame).

The data provided by the analysis may be compared to determine whether the camera motion is unintentional or intentional. The current frame motion may be compared to the accumulated motion to determine a motion difference ΔROT1 (box 420). The motion difference ΔROT1 may be the difference between the accumulated motion of the previous frames and the instantaneous motion of the currently processed frame. The motion difference ΔROT1, may indicate the intended camera movement or the unintended camera movement from the first frame to the current frame. The distinguishing factor between the unintentional and intentional camera movement may be the magnitude of the motion difference ΔROT1 (e.g., rotational angle delta).

In an embodiment, motion difference ΔROT1 may be compared with a first threshold (box 430). If the motion difference ΔROT1 is below the first threshold (box 430), then a comparison of the current frame motion can be made to the previous frame motion (box 440). If the motion difference ΔROT1 is above the first threshold (box 430), then a low video stabilization strength can be derived (box 470).

The current frame motion may also be compared to the previous frame motion to determine a motion difference ΔROT2 (box 440). The motion difference ΔROT2 may indicate the intended camera movement or the unintended camera movement between the previous frame and the current frame. The distinguishing factor between the unintentional and intentional camera movement may be the magnitude of the motion difference ΔROT2 (e.g., rotational angle delta).

In an embodiment, motion difference ΔROT2 may be compared with a second threshold (box 450). If the motion difference ΔROT2 is below the second threshold (box 450), then a high video stabilization strength can be set (box 460). However, if the motion difference ΔROT2 is above the second threshold (box 450), then a low video stabilization strength can be set (box 470).

The instantaneous motion of a previous frame may be computed dynamically. The instantaneous motion of the current frame may be stored so that it can be used as an instantaneous motion of the previous frame during the next frame. The accumulated motion of the previous frames may be computed dynamically, where each currently processed frame's motion data is used to update the accumulated motion during each iteration. The accumulated motion may be the average rotation of the camera. The accumulated motion may represent an estimated intended position of the camera prior to the point in time when the current video frame was recorded. The instantaneous motion and the accumulated motion of the frames may be calculated by feeding the motion of the frames through a lowpass filter to eliminate high frequency components. The lowpass filter may be an infinite impulse response (IIR) lowpass filter.

The comparison of the motion of the current frame to the accumulated motion (box 420) and the comparison of the motion of the current frame to the previous frame motion (box 440) can be interchanged. Setting the low video stabilization strength (box 470) and setting the high video stabilization strength (box 460) may include setting a stabilization strength based on the degree of the instantaneous motion or the motion difference between the current frame and the previous frame or the accumulated motion. In an embodiment, the video stabilization strength may be a linear function of the motion difference between at one of motion differences ΔROT1 and ΔROT2. The motion difference may be the rotation angle delta. In another embodiment, the function may be a non-linear function, for example, an exponential function of the rotational angle delta. In a further embodiment, the function may be implemented via a look up table.

Figure 5:
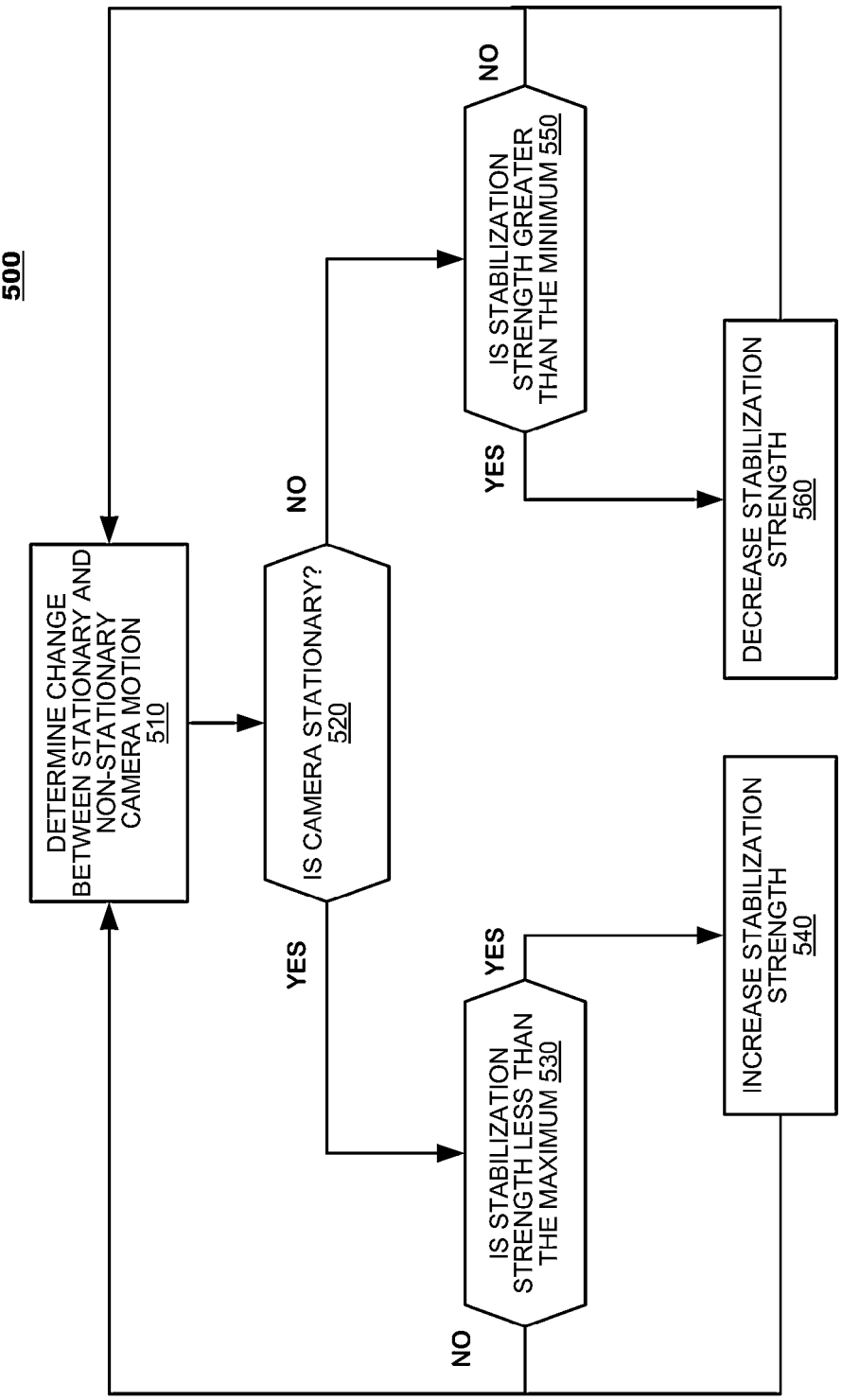
FIG. 5 illustrates a method for setting a video stabilization strength when transitioning between stationary and non-stationary modes.

FIG. 5 illustrates a method 500 for setting a video stabilization strength when transitioning between stationary and non-stationary modes. During the stationary mode video stabilization strength may be set higher to account for unintended camera motion (e.g., motion due to shaky hands). In contrast, during the non-stationary mode the video stabilization strength may be set lower to account for intended camera motion (e.g., panning of the camera).

The strength of the video stabilization can be adjusted when a change is detected between stationary and non-stationary modes of the camera (box 510). If a change is detected (box 510), a determination can be made whether the camera is held in the stationary mode or non-stationary mode (box 520).

If the camera is in the stationary mode, then a determination can be made whether the currently set stabilization strength is below a preset maximum stabilization strength (box 530). If the currently set stabilization strength is below the maximum stabilization strength, then the stabilization strength can be increased (box 540). The stabilization strength can be increased (box 540) by a predetermined value or by a value corresponding to a degree of detected motion. The stabilization strength can be increased to a value that does not exceed the maximum stabilization strength. If the stabilization strength is not below the maximum strength (box 530), then the stabilization can be maintained at the current setting. After changing the stabilization strength (box 540) monitoring can be performed to determine a transition between stationary and non-stationary modes.

If the camera is in the non-stationary mode, then a determination can be made whether the currently set stabilization strength is greater than a preset minimum stabilization strength (box 550). If the currently set stabilization strength is greater than the minimum stabilization strength, then the stabilization strength can be decreased (box 560). The stabilization strength can be decreased (box 560) by a predetermined value or by a value corresponding to a degree of detected motion. The stabilization strength can be decreased to a value that does not decrease below the minimum stabilization strength. If the stabilization strength is not above the minimum stabilization strength (box 550), then the stabilization can be maintained at the current setting. After changing the stabilization strength (box 560) monitoring can be performed to determine a transition between stationary and non-stationary modes.

Increasing or decreasing the stabilization strength may include gradually increasing or decreasing the stabilization strength over a predetermined time period or over a predetermined number of frames. The gradual increase or decrease of the stabilization strength may provide for a smooth transition between the different strengths of video stabilization.

In an embodiment, transitioning from a non-stationary mode to a stationary mode may include providing a predetermined delay before increasing the stabilization strength. The predetermined delay may be between one or two seconds, but is not so limited. The delay may allow for the user to stabilize the camera or scene before the degree of stabilizing the video is increased to account for undesired motion (e.g., motion due to shaky hands). The gradual increase of the stabilization strength may be performed during the predetermined delay.

In a further embodiment, transitioning from a stationary mode to a non-stationary mode may include providing a predetermined delay before decreasing the stabilization strength. The predetermined delay may be between a quarter and a half of a second, but is not so limited. The shorter delay, as compared to the delay provided when transitioning from a stationary mode to a non-stationary mode, may be needed because the video stabilization unit may not be able to correct for the large motion due to intentional motion (e.g., panning of the camera). The gradual decrease of the stabilization strength may be performed during the predetermined delay.

In a further embodiment, transitioning from a stationary mode to a non-stationary mode may include computing translation vectors for both dimensions of the image before decreasing the stabilization strength. Translation vectors can be calculated from the camera motion. The translation magnitude in the x direction of each frame is compared to a predefined threshold. If the translation magnitude is larger than the threshold, the frame is determined as moving, and the direction of movement is recorded (left or right). Within a window of a predetermined number of frames, if all the frames are determined as moving and the direction of movement is the same, the camera is determined to be panning in the x direction and the accumulated panning speed in the x direction is calculated. Similarly, the translation in the y direction of each frame is analyzed within the window of a predetermined number of frames to determine whether the camera is panning in the y direction (up or down). If so, the accumulated panning speed in the y direction is calculated. If the camera is determined to be panning in the x direction or the y direction, the stabilization strength decrease is determined based on the accumulated panning speed. If the camera is determined panning in both x and y directions, the maximum of the accumulated panning speed is used in aforementioned determination.

In an embodiment, the video stabilization unit 130 (shown in FIG. 1) may provide a different degree of stabilization in one direction as compared to the degree of stabilization provided in a perpendicular direction. For example, the video stabilization unit 130 may provide a low degree of stabilization in the x direction of the image while providing a high degree of stabilization in the y direction. Such a configuration may provide the needed stabilization in the y direction due to unintended motion (e.g., shaky hands) while minimizing the stabilization in the x direction because of intended motion due to panning the camera in the x direction.

Thus, different analyses can be performed for the x direction on the video sequence and for the y direction on the video sequence. The degree of stabilization in each of the directions can be based on whether the respective motion in each of the directions is intentional or unintentional.

Figure 6:
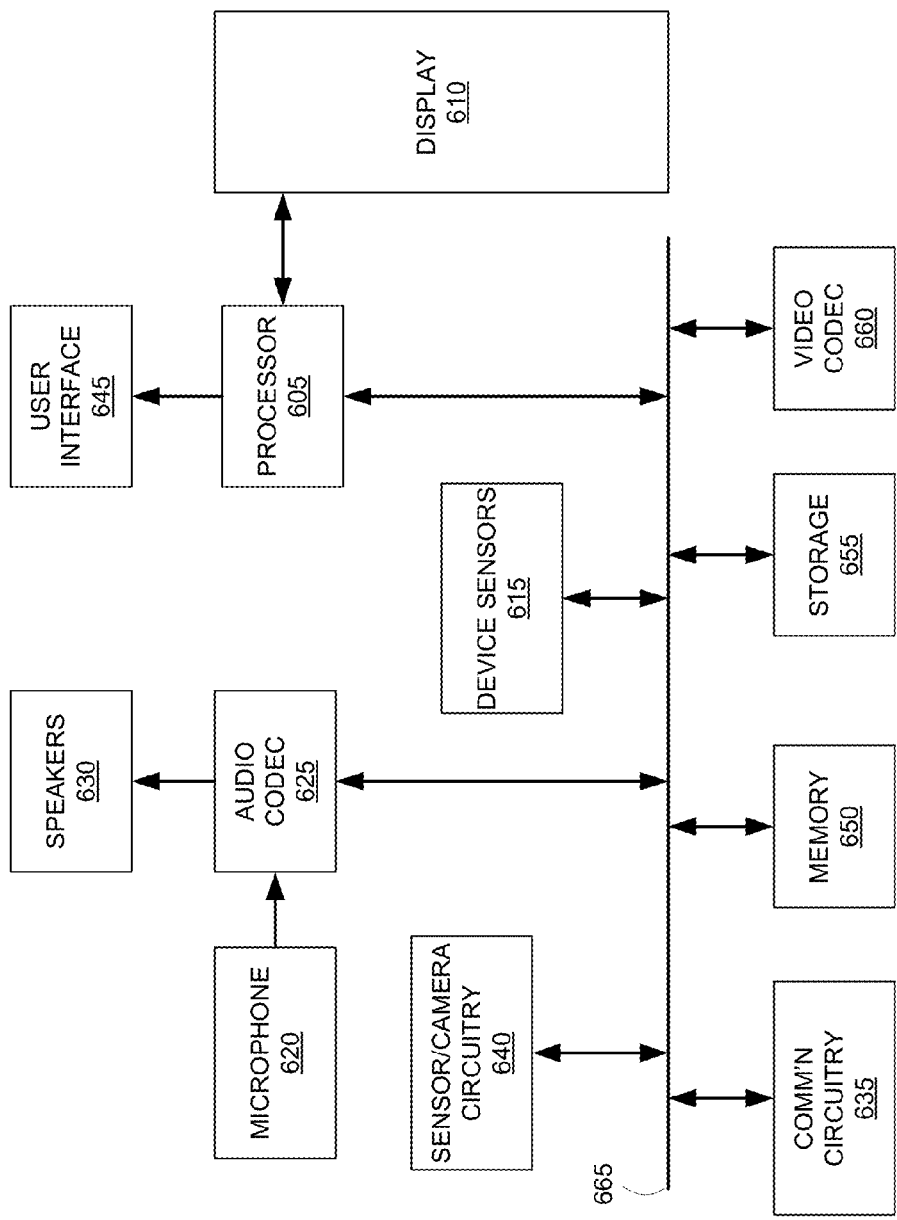
FIG. 6 is a simplified functional block diagram of a representative electronic device incorporating digital video capture capability according to one embodiment.

FIG. 6 is a simplified functional block diagram of representative electronic device 600 incorporating digital video capture capability is shown according to one embodiment. Electronic device 600 may include processor 605, display 610, device sensors 615 (e.g., gyro, accelerometer, proximity, and ambient light sensors), microphone 620, audio codec 625, speaker 630, communications circuitry 635, image sensor with associated camera and video hardware 640, user interface 645, memory 650, storage device 655, video codec(s) 660 and communications bus 665.

Processor 605 may be any suitable programmable control device or general or special purpose processor or integrated circuit and may execute instructions necessary to carry out or control the operation of many functions, such as the generation and/or processing of image metadata, as well as other functions performed by electronic device 600. Processor 605 may for instance drive display 610 and may receive user input from user interface 645. Processor 605 also may be, for example, a system-on-chip such as an application's processor such as those found in mobile devices or a dedicated graphics processing unit (GPU). Processor 605 may be based on reduced instruction-set computer (RISC) or complex instruction-set computer (CISC) architectures or any other suitable architecture and may include one or more processing cores.

Memory 650 may include one or more different types of storage media used by processor 605 to perform device functions. Memory 650 may include, for example, cache, read-only memory (ROM), and/or random access memory (RAM). Communications bus 660 may provide a data transfer path for transferring data to, from, or between at least storage device 655, memory 650, processor 605, and camera circuitry 640. User interface 645 may allow a user to interact with electronic device 600. For example, user interface 645 can take a variety of forms, such as a button, keypad, dial, a click wheel, or a touch screen.

Non-transitory storage device 655 may store media (e.g., image and video files), computer program instructions or software, preference information, device profile information, and any other suitable data. Storage device 655 may include one more storage mediums including, for example, magnetic disks (fixed, floppy, and removable) and tape, optical media such as CD-ROMs and digital video disks (DVDs), and semiconductor memory devices such as Electrically Programmable Read Only Memory (EPROM), and Electrically Erasable Programmable Read-Only Memory (EEPROM).

Video codec 660 may be a hardware device, a software module or a combination of hardware and software that enables video compression and/or decompression of digital video. For example, video codec 660 may implement the H.264 video standard. Communications bus 665 may be any one or more communication paths and employ any technology or combination thereof that is appropriate for the particular implementation.

Software may be organized into one or more modules and be written in any suitable computer programming language (or more than one language). When executed by, for example, processor 605 such computer program code or software may implement one or more of the methods described herein.

Various changes in the materials, components, circuit elements, as well as in the details of the illustrated operational methods are possible without departing from the scope of the following claims. For instance, processor 605 may be implemented using two or more program control devices communicatively coupled. Each program control device may include the above-cited processors, special purpose processors or custom designed state machines that may be embodied in a hardware device such as an application specific integrated circuit (ASIC) or a field programmable gate array (FPGA). In addition, the techniques disclosed herein may be applied to previously captured video sequences, providing the necessary metadata has been captured for each video frame.

In the above description, for purposes of explanation, numerous specific details have been set forth in order to provide a thorough understanding of the inventive concepts. As part of this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture and processing field having the benefit of this disclosure.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

We claim:

1. A video stabilization method, comprising:
   obtaining motion data corresponding to motion of a camera;
   determining a first motion difference between an instantaneous motion corresponding to camera movement for a current frame in a video sequence and an accumulated motion corresponding to camera movement from a frame located a plurality of frames prior to the current frame in the video sequence to the current frame;
   determining a second motion difference between the instantaneous motion corresponding to camera movement for the current frame and an instantaneous motion corresponding to camera movement for a frame previous to the current frame in the video sequence;
   comparing the first motion difference to a first threshold value and the second motion difference to a second threshold value;
   setting a video stabilization strength parameter for the current frame based on results of the comparison; and
   performing video stabilization on captured video data of the current frame according to the frame's strength parameter.

2. The method of claim 1, wherein:
   the instantaneous motion of the camera corresponds to intentional camera movement from the frame preceding the current frame to the current frame of the video sequence; and
   the accumulated motion of the camera corresponds to intentional camera movement from a first frame of the video sequence to the current frame of the video sequence.

3. The method of claim 1, wherein the video stabilization strength parameter is set to:
   a high strength value when the first motion difference is below the first threshold value and the second motion difference is below the second threshold value; and
   a low strength value when the first motion difference is higher than the first threshold value or the second motion difference is higher than the second threshold value.

4. The method of claim 1, wherein the motion data is derived from gyroscopic sensor data.

5. The method of claim 1, wherein computing the accumulated motion or the instantaneous motion includes filtering the motion data.

6. The method of claim 1, wherein the motion data is derived from accelerometer sensor data.

7. The method of claim 1, wherein the motion data is rotational data.

8. The method of claim 1, wherein the camera is a portable electronic device.

9. The method of claim 1, wherein setting the video stabilization strength parameter includes:
   increasing a value of the video stabilization strength parameter if a change from non-stationary camera motion to stationary camera motion is detected based on the results of the comparison; and
   decreasing the value of the video stabilization strength parameter if a change from stationary camera motion to non-stationary camera motion is detected based on the results of the comparison.

10. The method of claim 1, wherein the computing of instantaneous motion of the camera includes using a first lowpass filter.

11. The method of claim 10, wherein the computing of accumulated motion of the camera includes using a second lowpass filter.

12. The method of claim 1, wherein the computing of instantaneous motion of the camera includes computing at least one of a sum or a difference using a first infinite impulse lowpass filter.

13. The method of claim 12, wherein the computing of accumulated motion of the camera includes computing at least one of a sum or a difference using a second infinite impulse lowpass filter.

14. The method of claim 1, wherein the computed instantaneous motion of the camera corresponds to a camera angle rotation from the frame preceding the current frame to the current frame.

15. The method of claim 1, wherein the computed accumulated motion of the camera corresponds to a camera angle rotation from the frame located a plurality of frames prior to the current frame to the current frame.

16. The method of claim 9, further comprising providing a predetermined delay before increasing the value of the video stabilization strength parameter.

17. The method of claim 9, further comprising providing a predetermined delay before decreasing the value of the video stabilization strength parameter.

18. The method of claim 1, further comprising:
for each frame of a plurality of frames in the video sequence:
computing accumulated motion of the camera corresponding to camera movement from a frame located a plurality of frames prior to the frame in the video sequence to the frame;
determining a minimum value and a maximum value of the accumulated motion calculated for frames prior to the frame in the plurality of frames of the video sequence;
determining a difference between the minimum value and the maximum value of the accumulated motion;
comparing the difference between the minimum value and the maximum value of the accumulated motion to a third threshold value; and
setting the video stabilization strength parameter for the frame based on the comparison to the third threshold value.

19. A non-transitory machine-readable storage medium having program instructions, which when executed perform a method, the method comprising:
obtaining motion data corresponding to motion of a camera;
determining a first motion difference between an instantaneous motion corresponding to camera movement for a current frame in a video sequence and an accumulated motion corresponding to camera movement from a frame located a plurality of frames prior to the current frame in the video sequence to the current frame;
determining a second motion difference between the instantaneous motion corresponding to camera movement for the current frame and an instantaneous motion corresponding to camera movement for a frame previous to the current frame in the video sequence;
comparing the first motion difference to a first threshold value and the second motion difference to a second threshold value;
setting a video stabilization strength parameter for the current frame based on results of the comparison; and
performing video stabilization on captured video data of the current frame according to the frame's strength parameter.

20. The non-transitory machine-readable storage medium of claim 19, wherein the video stabilization strength parameter is set to:
a high strength value when the first motion difference is below the first threshold value and the second motion difference is below the second threshold value; and
a low strength value when the first motion difference is higher than the first threshold value or the second motion difference is higher than the second threshold value.

21. The non-transitory machine-readable storage medium of claim 19, wherein the motion data is derived from gyroscopic sensor data.

22. An apparatus comprising:
a processor for executing computer instructions, the computer instructions causing the processor to:
obtain motion data corresponding to motion of a camera;
determine a first motion difference between an instantaneous motion corresponding to camera movement for a current frame in a video sequence and an accumulated motion corresponding to camera movement from a frame located a plurality of frames prior to the current frame in the video sequence to the current frame;
determine a second motion difference between the instantaneous motion corresponding to camera movement for the current frame and an instantaneous motion corresponding to camera movement for a frame previous to the current frame in the video sequence;
compare the first motion difference to a first threshold value and the second motion difference to a second threshold value;
set a video stabilization strength parameter for the current frame based on results of the comparison; and
perform video stabilization on captured video data of the current frame according to the frame's strength parameter.

23. The apparatus of claim 22, wherein the video stabilization strength parameter is set to:
a high strength value when the first motion difference is below the first threshold value and the second motion difference is below the second threshold value; and
a low strength value when the first motion difference is higher than the first threshold value or the second motion difference is higher than the second threshold value.

24. An apparatus comprising:
a camera to capture a video sequence;
a motion sensor to capture motion data associated with the video sequence;
a controller to:
determine a first motion difference between an instantaneous motion corresponding to camera movement for a current frame in a video sequence and an accumulated motion of the camera corresponding to camera movement from a frame located a plurality of frames prior to the current frame in the video sequence to the current frame,
determine a second motion difference between the instantaneous motion corresponding to camera movement for the current frame and an instantaneous motion of the camera corresponding to camera movement for a frame previous to the current frame in the video sequence,
compare the first motion difference to a first threshold value and the second motion difference to a second threshold value, and set a video stabilization strength parameter for the current frame based on results of the comparison; and a video stabilization unit to perform video stabilization on captured video data of the current frame according to the frame's strength parameter.

25. The apparatus of claim 24, wherein the video stabilization strength parameter is set to:
   a high strength value when the first motion difference is below the first threshold value and the second motion difference is below the second threshold value; and
   a low strength value when the first motion difference is higher than the first threshold value or the second motion difference is higher than the second threshold value.

26. A non-transitory machine-readable storage medium storing video data generated according to a process comprising:
   capturing video data with a camera,
   capturing motion data with a motion sensor,
   processing the video data with a processor by:
      determining, from the motion data, a first motion difference between an instantaneous motion corresponding to camera movement for a current frame in a video sequence and an accumulated motion of the camera corresponding to camera movement from a frame located a plurality of frames prior to the current frame in the video sequence to the current frame,
      determining, from the motion data, a second motion difference between the instantaneous motion corresponding to camera movement for the current frame and an instantaneous motion corresponding to camera movement for a frame previous to the current frame in the video sequence,
      comparing the first motion difference to a first threshold value and the second motion difference to a second threshold value,
      setting a video stabilization strength parameter for the current frame based on results of the comparison, and
      performing video stabilization on captured video data of the current frame according to the frame's strength parameter; and
   storing the stabilized video data on the storage medium.

27. A video stabilization method, comprising:
   obtaining motion data corresponding to motion of a camera;
   determining a motion difference between an instantaneous motion corresponding to camera movement for a current frame in a video sequence and an accumulated motion corresponding to camera movement from a frame located a plurality of frames prior to the current frame in the video sequence to the current frame;
   comparing the motion difference to a first threshold value;
   setting a video stabilization strength parameter for the current frame based on results of the comparison; and
   performing video stabilization on captured video data of the current frame according to the frame's strength parameter.

28. The method of claim 27, further comprising:
   determining a second motion difference between the instantaneous motion corresponding to camera movement for the current frame and an instantaneous motion corresponding to camera movement for a frame previous to the current frame in the video sequence; and
   comparing the second motion difference to a second threshold value;
   wherein the video stabilization strength parameter is set based on results of the comparison of the motion difference to the threshold value and the comparison of the second motion difference to the second threshold value.

29. A non-transitory machine-readable storage medium having program instructions, which when executed perform a method, the method comprising:
   obtaining motion data corresponding to motion of a camera;
   determining a motion difference between an instantaneous motion corresponding to camera movement for a current frame in a video sequence and an accumulated motion corresponding to camera movement from a frame located a plurality of frames prior to the current frame in the video sequence to the current frame;
   comparing the motion difference to a first threshold value;
   setting a video stabilization strength parameter for the current frame based on results of the comparison; and
   performing video stabilization on captured video data of the current frame according to the frame's strength parameter.

30. The non-transitory machine-readable storage medium of claim 29, the method further comprising:
   determining a second motion difference between the instantaneous motion corresponding to camera movement for the current frame and an instantaneous motion corresponding to camera movement for a frame previous to the current frame in the video sequence; and
   comparing the second motion difference to a second threshold value;
   wherein the video stabilization strength parameter is set based on results of the comparison of the motion difference to the threshold value and the comparison of the second motion difference to the second threshold value.

* * * * *